Patented Jan. 6, 1925.

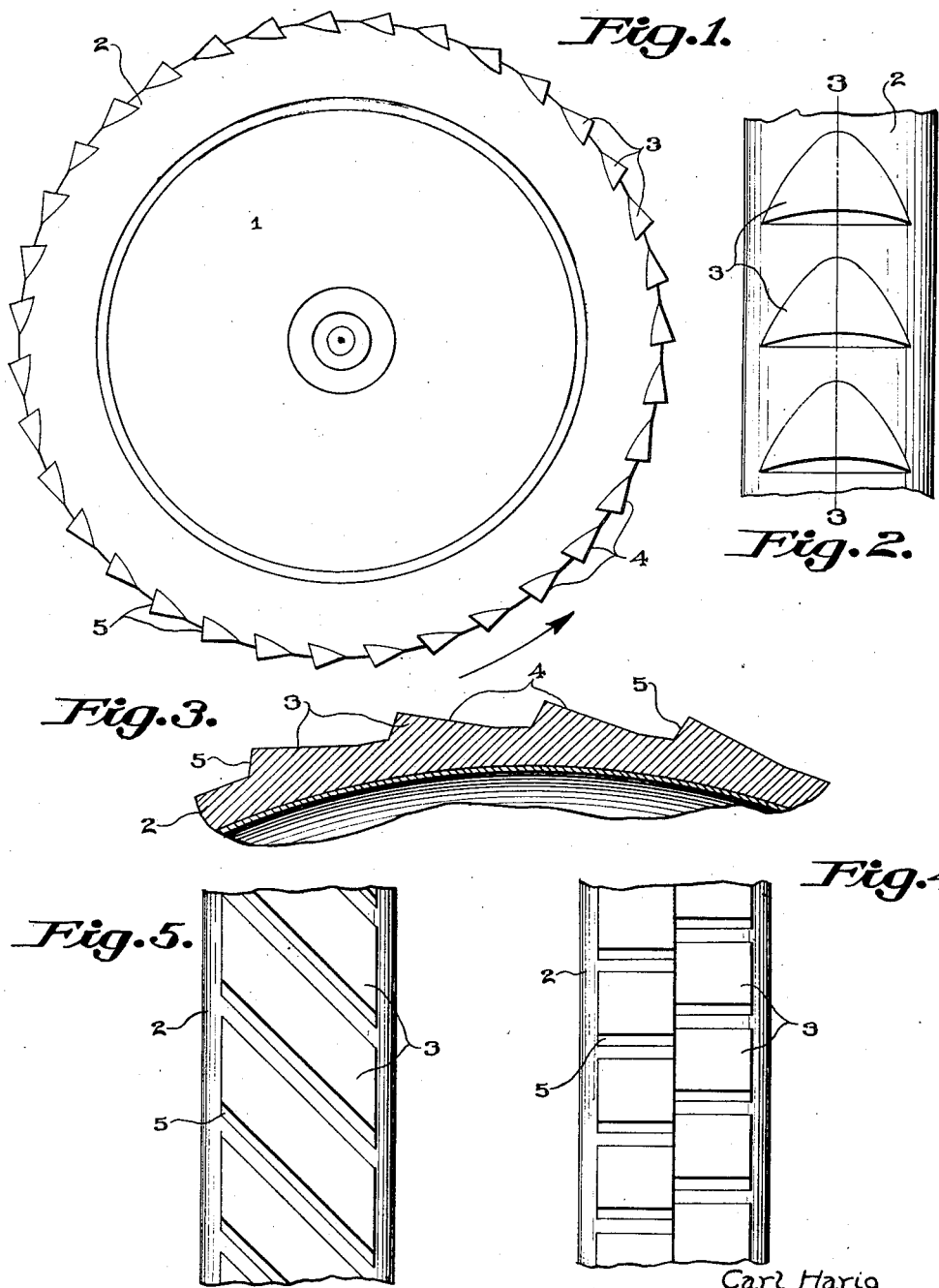

1,522,448

UNITED STATES PATENT OFFICE.

CARL HARIG, OF SAN ANTONIO, FLORIDA.

TIRE.

Application filed October 16, 1922. Serial No. 594,882.

*To all whom it may concern:*

Be it known that I, CARL HARIG, a citizen of Germany, residing at San Antonio, in the county of Pasco and State of Florida, have invented new and useful Improvements in Tires, of which the following is a specification.

The object of this invention is to provide a vehicle wheel with a traction surface of a character which will gently but effectively grip the ground to insure the travel of the wheel over sandy, muddy or irregular road surfaces.

To the attainment of the foregoing, and other objects which will present themselves as the nature of the invention is better understood, reference is to be had to the drawing which accompanies and which forms part of this application.

In the drawing:—

Figure 1 is a side elevation of a wheel having a tire in accordance with this invention.

Figure 2 is a fragmentary edge view thereof.

Figure 3 is a sectional view on the line 3—3 of Figure 2.

Figure 4 is a view similar to Figure 2, but illustrating a slight modification.

Figure 5 is a similar view to Figure 4, but illustrating a still further modification.

Referring now to the drawing in detail, the numeral 1 designates a vehicle wheel and 2 the tire theron. The tire illustrated by the drawings is of the ordinary pneumatic character, but the improvement is also applicable to metal tires.

The tread surface of the tire 2 is integrally formed with calks 3 of a particular and peculiar construction. The calks are substantially wedge-shaped having inclined surfaces 4 terminating in oppositely inclined shoulders 5. The wheel turns in the direction of the arrow in Figure 1, so it will be seen that the outwardly inclined surfaces 4 of the calks 3 are gradually brought to road contacting engagement, and thereby afford a firm and nearly positive grip in loose sand or soft muddy roads. As the wheel moves ahead, the calks successively contacting the ground surface will embed themselves therein to increase the traction, but the particular and peculiar construction and arrangement of the calks prevent the same from digging up the road dirt and carrying the same away from under the wheel, which is true with respect to calks of the ordinary construction.

The shoulders of the calks may be arranged right angularly with respect to the longitudinal plane of the wheel, and the same may be arranged in spaced series, as illustrated in Figure 4 of the drawing, while still again, the straight surfaces of the calks may be arranged angularly with respect to the longitudinal plane of the wheel, as disclosed in Figure 5 of the drawing, and it is thought that the foregoing description, when taken in connection with the drawing will fully set forth the construction and advantages of the improvement to those skilled in the art to which such inventions relate without further detailed description.

Having described the invention, I claim:—

A tire of the character described comprising a body portion, wedge shaped calks formed on the tread portion thereof and having inclined outer surfaces curved transversely and merging into the curvature of the tire, and each calk from its inclined outer surface being provided with an oppositely inclined shoulder terminating in close proximity to the adjacent calk.

In testimony whereof I affix my signature.

CARL HARIG.